Sept. 15, 1970          L. L. ROUTH          3,529,275
ELECTRIFIED TRACK SYSTEM FOR LIGHTING FIXTURES AND THE LIKE
Filed Jan. 4, 1968          2 Sheets-Sheet 1
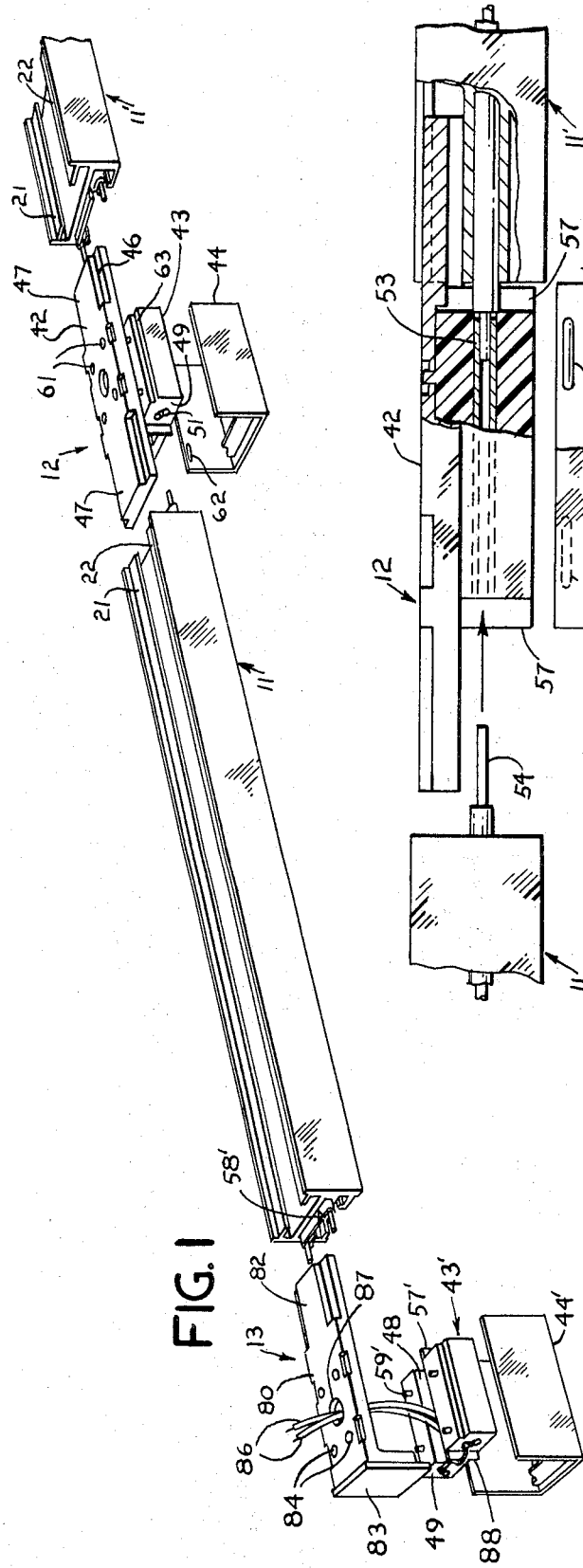
INVENTOR.
Larry L. Routh
BY
Gardner + Zimmerman
Attorneys Sept. 15, 1970     L. L. ROUTH     3,529,275
ELECTRIFIED TRACK SYSTEM FOR LIGHTING FIXTURES AND THE LIKE
Filed Jan. 4, 1968     2 Sheets-Sheet 2
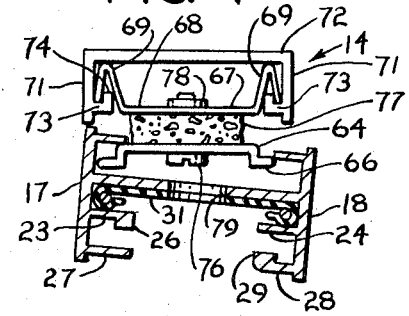
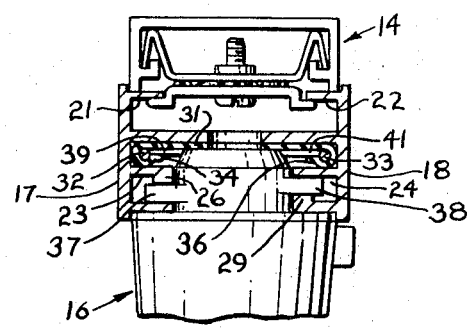
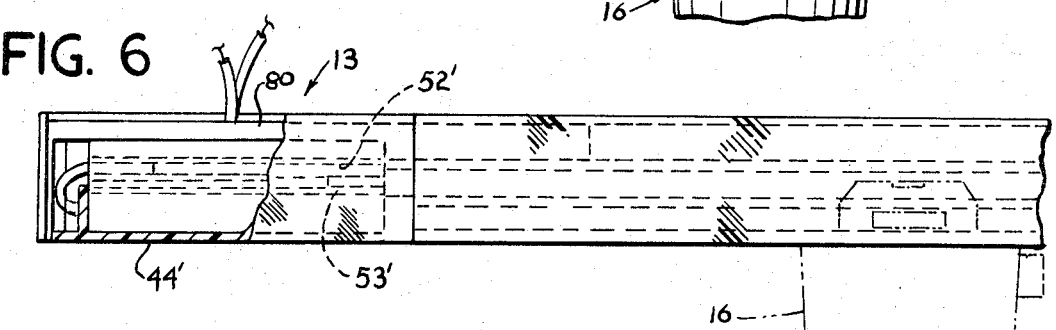
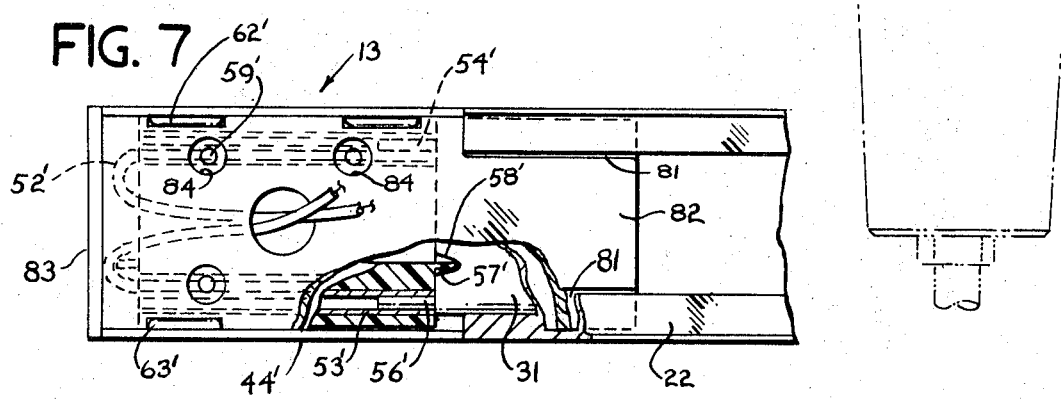
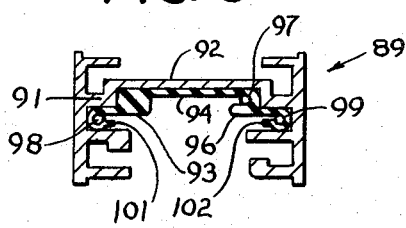
INVENTOR.
Larry L. Routh
BY
Gardner + Zimmerman
Attorneys

United States Patent Office 3,529,275
Patented Sept. 15, 1970

3,529,275
ELECTRIFIED TRACK SYSTEM FOR LIGHTING FIXTURES AND THE LIKE
Larry L. Routh, Castro Valley, Calif., assignor to U.S. Industries, Inc., New York, N.Y., a corporation of Delaware
Filed Jan. 4, 1968, Ser. No. 695,774
Int. Cl. H01r 13/60
U.S. Cl. 339—22    14 Claims

ABSTRACT OF THE DISCLOSURE

A system of electrified track for securance to a ceiling, and which is adapted to the mechanical and electrical connection of lighting fixtures to the track at any desired position thereof. The system includes one or more sections of track, connectors, and various couplers which may be assembled in a highly versatile manner to form unlimited design arrangements for meeting the requirements of a variety of types of lighting conditions. The system features a versatile hanger means for securing the tracks to a ceiling in an extremely expeditious manner.

BACKGROUND OF THE INVENTION

In order to provide flexibility in application, power distribution, and in meeting the requirements of many types of lighting conditions, various lighting systems have been devised wherein electrified tracks are provided on a ceiling and lighting fixtures, such as spot lights or the like, are mechanically and electrically connected to the tracks at any desired positions thereof. It is of course desirable from the standpoint of the utmost in flexibility and versatility of design, that the tracks be capable of being assembled in a variety of different design arrangements or configurations. In addition, it is advantageous that the various tracks of a system be readily securable to a ceiling in a simple manner in order to minimize the time and effort of installation.

SUMMARY OF THE INVENTION

The present invention is concerned with an extremely versatile system of electrified track for use in a lighting system. The system includes one or more elongated sections of track having novel hanger means for securing the track sections to a ceiling in a variety of different ways and with a minimum of effort. In this respect, the hanger means include a spacer adapted to be secured to a ceiling and a clip connectable with a track section of the system. A compressible resilient pad is disposed intermediate the spacer and clip and is compressed therebetween by a screw-type fastener used to interconnect the spacer and clip. In addition, there are provided various connectors and couplers for cooperating with the sections of track in providing diverse track systems suited to meeting the requirements of different lighting conditions.

As an important feature of the invention, provision is made to insure proper polarity in the connection of one track section to another, i.e., connection of the neutral side of section to the neutral side of another. In this same reference, the track sections provide means for releasably supporting bus-bar-equipped lighting-fixture adaptor plugs so that the bus bars thereof are connected electrically with conductors provided by the track section, but a predetermined orientation is inforced on the adaptor plugs so that proper polarity is observed.

BRIEF DESCRIPTION OF THE DRAWINGS

FIG. 1 is an exploded perspective view of an electrified track system in accordance with the invention.

FIG. 2 is a side elevational view of a connector of the track system.

FIG. 3 is a plan view of the connector of FIG. 2.

FIG. 4 is a sectional view of the hanger means of a track section of the system, depicting the track section and hanger means being assembled.

FIG. 5 is a view similar to FIG. 4, but illustrating the track section and hanger means in assembled condition.

FIG. 6 is a side elevational view of an end feeder member of the track system.

FIG. 7 is a plan view of the end member of FIG. 6.

FIG. 8 is a transverse sectional view of an alternative embodiment of track section.

DETAILED DESCRIPTION OF THE PREFERRED EMBODIMENTS

Referring now to FIG. 1, a track system in accordance with the present invention will be seen to include one or more electrified track sections 11, 11¹, adjacent ones of which are interconnected by means of a connector assembly 12. An end one of the track sections is provided with an end feeder means 13 for electrically energizing the interconnected track sections 11, 11¹ of the system. In addition, each track section is provided with at least one hanger element 14 of novel design which enables the track section to be secured to a ceiling in a variety of ways in a highly expeditious manner. The overall track system facilitates the mechanical and electrical connection of one or more lighting fixtures thereto at any desired position through the intermediary of a plug adaptor 16.

Considering now one of the track sections 11 in detail and referring particularly to FIG. 5, it is to be noted that the track section is of elongated rectangular configuration having a readily extrudable cross section designed to meet the requirements of the system. More particularly, track section 11 includes a pair of parallel spaced side walls 17, 18 interconnected by a substantially intermediate transverse web 19. Projecting inwardly from the side walls there are provided a pair of longitudinally extending horizontal shelf strips 21, 22 which are spaced slightly downward from the upper edges of the side walls and upwardly spaced from the web. Subjacent the web there are provided a pair of longitudinally extending horizontal shelf strips 23, 24 in downwardly spaced relation so as to define a channel therebetween. One of the strips 23 is formed with a right angularly downwardly extending lip 26 at its inner edge. Subjacent the strips 23, 24 there are provided in downwardly spaced relation another pair of longitudinally extending horizontal shelf strips 27, 28 projecting inward from the side walls 17, 18. The strips 27, 28 are spaced slightly upward from the lower edges of the side walls. One strip 28 associated with the opposite side wall 18 from strip 23 associated with side wall 17 is formed with a right angularly upwardly extending lip 29 at its inner edge.

An elongated insulating element 31, which in the illustrated case has a pair of longitudinally extending conductors 32, 33 embedded therein, is disposed in the channel defined between the web 19 and downwardly spaced strips 21, 22. More particularly the element 31 is of generally rectangular configuration with arcuately reentrantly inwardly turned flanges 34, 36 at its opposite side edges. The conductors 32, 33 are disposed in the spaces defined between the flanges 34, 36 and upper wall of the insulating element 31.

Each plug adaptor 16 associated with a lighting fixture to be connected to a track section is provided with off-set outwardly projecting tabs 37, 38 respectively for engagement between the lip 26 and strip 27 and between the lip 29 and strip 24 to mechanically connect the adaptor of outwardly projecting bus bars 39, 41 which are adapted to the track section. Each adaptor further includes a pair to extend between the spaces defined between the flanges 34, 36 and upper wall of the insulating element 31 into electrical contact with the conductors 32, 33. In this manner, the adaptors 16 may be mechanically and electrically connected to a track section at any desired position.

Considering now one of the connector assemblies 12 in detail for mechanically and electrically connecting adjacent track sections 11, 11¹ together, reference is made to FIGS. 2 and 3. As shown therein, the assembly includes a coupler plate 42 for mechanically securing the track sections together, an electrical connector 43 for electrically interconnecting the conductors 32, 33 thereof, and a cover 44 for enclosing the connector. The plate 42 is of elongated rectangular configuration provided with rectangular recesses 46 in the top face thereof at its four corners. The recesses define a pair of longitudinally extending tongues 47 in the top face of the plate. The tongues are arranged to engage the gaps between strips 21, 22 of adjacent track sections 11, 11¹, the recesses 46 engaging the under faces of the strips, to mechanically lock the track sections together. The connector 43 is provided as a substantially rectangular block of insulating material having a central longitudinal channel 48 defining a pair of parallel transversely spaced longitudinal portions 49. Each portion 49 is provided with a longitudinally extending bore 51 having a pair of interconnected tubular conducting spring clips 52, 53 extending therethrough. The lower set of clips 53 is adapted to receive longitudinally projecting prong portions 54, 56 of conductors 32, 33. In order to insure a proper polarity of connection between the conductors of two adjacent track sections, i.e., neutral conductor to neutral conductor, the connector 43 is provided with a pair of aligned, longitudinally projecting tabs 57 transversely off-set from the longitudinal center line of the connector. The tabs 57 engage notches 58 provided in the top wall of insulating element 31 at the opposite ends thereof at transversely off-set positions from the longitudinal center line thereof. By virtue of the off-set positions of the tabs 57 and notches 58 it is impossible to employ the connector to connect the conductors 32, 33 of adjacent track sections with an improper polarity relationship.

To secure the connector to the coupler plate 42, the upper face of the connector is provided with a plurality of upwardly projecting pins 59. The pins frictionally engage a plurality of bushings 61 provided in the coupler plate. Thus, to connect two adjacent track sections, the connector 43 is first secured to the coupler plate 42 by means of the pins 59 and bushings 61, the tabs 57 and notches 58 being aligned for interengagement to insure a proper polarity connection. The track sections are then engaged with the tongues 47 and recesses 46 of the coupler plate 42 and the prongs 54, 56 are engaged in the set of clips 53. The cover 44 is then secured in position, such cover being of channel shaped configuration and having a pair of transversely inwardly projecting flanges 62 engageable with a pair of longitudinally extending grooves 63 formed in the opposite sides of the connector 43.

Referring now to FIGS. 4 and 5, the use of the novel hanger element 14 will be seen to be illustrated. The hanger element comprises a hanger clip 64 of rectangular configuration including downwardly and outwardly turned flanges 66 adapted to engage the underfaces of the strips 21, 22. Cooperating with the clip 64 there is provided a retaining member 67 including a rectangular portion 68 having upwardly, arcuately, reentrantly turned ears 69 along its opposite side edges. The lower edges of the ears 69 are adapted to engage in channels formed along interior side walls 71 of a generally rectangular box like spacer element 72 having an open end facing the track section. More particularly, projecting transversely inward from the side walls 71 are provided a pair of longitudinally extending horizontal shelfs 73 having right angularly upwardly turned lips 74 at their inner side edges to define the channels. The portion 68 of retaining member 67 and the clip 64 are traversed by a screw 76 and a compressible resilient rectangular pad 77 of foam rubber, or the like, is interposed therebetween. A nut 78 is threadably secured to the end of the screw.

To install a track section 11 upon a ceiling, one or more of the spacer elements 72 is secured to the ceiling by means of a bolt, stem hanger, or the like secured to the upper wall of the element. Thereafter, the retaining member 67 is placed in position with the lower edges of ears 69 engaging the channels defined by the shelves 73 and lips 74. The clip 64 is secured to the retaining element by means of the screw 76 and nut 78, the pad 77 being interposed between the clip and retaining member. With the nut 78 in loose engagement with the screw 76, the pad 77 is expanded to separate the lower edges of ears 69 and flanges 66. It is extremely important to note that despite the separation between the ears and flanges, the clip and retaining member are prevented from being disoriented by the frictional engagement of the pad. After the track section is engaged with the clip and retaining member, as shown in FIGURE 4, the track section may be secured to the spacer element 72, to thereby secure the track section to the ceiling, by tightening the screw 76 and nut 78, thereby compressing the pad 77. To facilitate such action the web 19 is provided with a longitudinally extending slot 79 through which a screw driver, or the like, may be inserted to tighten the screw.

Referring now to FIGS. 6 and 7, an end feeder means 13 of the track system will be seen to be generally similar to the connector assemblies 12. In this regard the means 13 includes a rectangular plate 80 which is provided with a pair of rectangular recesses 81 at one end of the top face thereof extending along its opposite sides. The recesses define a longitudinally extending tongue 82 in the top face of the plate arranged to engage the gap between strips 21, 22 of an end one of the track sections 11, the recesses 81 engaging the under faces of the strips to lock the plate to the track section. The opposite end of the plate is provided with a depending closure wall 83.

The feeder means 13 also includes a connector 43¹ of the type previously described. The lower set of spring clips 53¹ are engaged upon longitudinally projecting prong portions 54¹, 56¹ of the track conductors 32, 33 so as to establish electrical contact therewith. One of the tabs 57¹ of the connector block engages a notch 58¹ provided in the end of insulating element 31 to insure proper polarity of the connection. Securance of the connector 43¹ to the plate 80 is facilitated by the upwardly projecting pins 59¹ frictionally engaging a plurality of bushings 84 provided in the plate.

Electrical feed to the connector 43¹ is accomplished by means of a pair of lead in wires 86 which extend downwardly through an aperture 87 in the plate into connection with the upper set of clips 52¹. More particularly, the ends of the wires are connected to contact prongs 88 which engage the clips 52¹. Since clips 52¹ are interconnected with clips 53¹, feed in of electrical power from wires 86 to track conductors 32, 33 is hence facilitated.

The end feed means 13 is completed by means of a cover 44¹ of the type previously described. The inwardly projecting flanges 62¹ of the cover engage the longitudinally extending lips 63¹ formed in the opposite sides of connector 43¹.

Although the invention has been previously described herein with reference to a two conductor track system, it will be appreciated that the inventive principles apply equally as well to a three conductor system. In this regard a modified form of track section 89 having three conductors is illustrated in FIG. 8. The section 89 is the same as the section 11 except that the intermediate transverse web 91 is provided with an upwardly stepped longitudinally extending central portion 92. The insulating element 93 of the track section is correspondingly modified from insulating element 31 such that the upper wall of the element 93 is provided with an upwardly stepped longitudinally extending central portion 94 which engages stepped portion 92 of web 91. A flange 96 projects inwardly from one side of the stepped portion 94 in downwardly spaced relation to the top wall and a conductor 97 is embedded in the gap therebetween. The other two conductors 98, 99 are disposed in the spaces defined between the top wall and reentrant flanges 101, 102 at the opposite side edges thereof.

I claim:

1. An electrified track system for lighting fixtures and the like comprising at least one track section of hollow generally rectangular elongated configuration having a lower longitudinally extending opening, an elongated insulating element carried within said track and section longitudinally thereof, at least two conductors embedded in said insulating element and extending longitudinally thereof, means within said track section for releasably supporting a bus-bar-equipped lighting-fixture adaptor plug in said track section with the bus bars engaging said conductors, a connector assembly for mechanically interconnecting adjacent pairs of track sections and electrically interconnecting the conductors disposed therein, end feeder means adapted to be mechanically connected to an end of a track section and electrically connected in energizing relation to the conductors disposed therein, and at least one hanger element for securing said track section to a ceiling, said track section including a pair of parallel spaced side walls interconnected by a substantially intermediate transverse web, a first pair of longitudinally extending horizontal shelf strips projecting inwardly from said side walls in downwardly spaced relation to the upper edges thereof and upwardly spaced relation to said web, a second pair of longitudinally extending horizontal shelf strips projecting inwardly from said side walls in downwardly spaced relation to said web, one of the second pair of strips projecting from a first of said side walls having a downwardly extending lip at its inner edge and a third pair of longitudinally extending horizontal shelf strips projecting inwardly from said side walls in downwardly spaced relation to said second pair of strips, one of the third pair of strips projecting from the second of said side walls having an upwardly extending lip at its inner edge, said insulating element being disposed between said web and second pair of strips, said second and third pairs of strips being adapted to mechanically support such an adaptor plug, said first pair of strips being adapted for mechanical securance of said connector assembly, said feeder means, and said hanger element thereto.

2. A system according to claim 1, further defined by said insulating element having an elongated rectangular upper wall with arcuately downwardly reentrantly inwardly turned flanges at its opposite side edges, said conductors respectively disposed between said upper wall of said element and said flanges.

3. A system according to claim 1, further defined by said hanger element comprising a clip of rectangular configuration including downwardly and outwardly turned side flanges engaging the under faces of said first pair of strips, a retaining member including a rectangular portion having upwardly arcuately reentrantly turned ears along its side edges, a generally rectangular box like spacer element having a downwardly facing opening, said spacer element having channels formed longitudinally along the interior faces of the side walls thereof, the lower edges of said ears engaging said channels, a compressible resilient pad interposed between said clip and retaining member, a screw upwardly traversing said clip, said pad, and said retaining member, a nut threadably engaging said screw, said web of said track section having a slot providing access to the head of said screw, said spacer element being adapted for securance to a ceiling.

4. A system according to claim 1, further defined by said connector assembly comprising a rectangular coupler plate having rectangular recesses in the top face thereof at its four corners defining a pair of longitudinally extending tongues in said top face, said tongues engaging the gaps between said first pair of strips of adjacent ones of said sections with said recesses engaging the underfaces of said first pairs of strips, a substantially rectangular insulating connector block having a pair of transversely spaced longitudinal bores adjacent the sides thereof, upper and lower interconnected tubular conducting longitudinally extending spring clips disposed in each of said bores, the lower set of said clips receiving longitudinally projecting pronged ends of said conductors of adjacent ones of said track sections, means securing said block to said plate, and a channel shaped housing secured in enclosing relation to said block.

5. A system according to claim 4, further defined by said block having a pair of aligned longitudinally projecting tabs transversely offset from the longitudinal center line of the block, said tabs engaging notches in the ends of the insulating elements of adjacent ones of said track sections, said notches transversely offset from the longitudinal center lines of said insulating elements.

6. A system according to claim 1, further defined by said feeder means comprising a rectangular plate having a pair of rectangular recesses at one end of the top face thereof extending along its opposite sides and defining a longitudinally extending tongue in the top face of said plate, said tongue engaging the gap between said first pair of strips of a first of said track sections, said recesses engaging the underfaces of said first pair of strips, said plate having a depending closure wall at the opposite end thereof, a substantially rectangular insulating connector block having a pair of transversely spaced longitudinal bores adjacent the sides thereof, upper and lower interconnected tubular longitudinally extending spring clips disposed in each of said bores, the lower set of said clips receiving longitudinally projecting pronged ends of said conductors of said first track section, means securing said block to said plate, a pair of lead in wires extending through an aperture in said plate, said wires having contact prongs at their ends engaging the upper set of said clips, and a channel shaped housing secured in enclosing relation to said block.

7. A system according to claim 6, further defined by said block having a pair of aligned longitudinally projecting tabs transversely offset from the longitudinal center line of the block, one of said tabs engaging a notch in the insulating element of said first track section.

8. A system according to claim 4, further defined by said hanger element comprising a clip of rectangular configuration including downwardly and outwardly turned side flanges engaging the under faces of said first pair of strips, a retaining member including a rectangular portion having upwardly arcuately reentrantly turned ears along its side edges, a generally rectangular box like spacer element having a downwardly facing opening, said spacer element having channels formed longitudinally along the interior faces of the side walls thereof, the lower edges of said ears engaging said channels, a compressible resilient pad interposed between said clip and retaining member, a screw upwardly traversing said clip, said pad, and said retaining member, a nut threadably engaging said screw, said web of said track section having a slot providing access to the head of said screw, said spacer element being adapted for securance to a ceiling.

9. A system according to claim 6, further defined by said hanger element comprising a clip of rectangular configuration including downwardly and outwardly turned side flanges engaging the under faces of said first pair of strips, a retaining member including a rectangular portion having upwardly arcuately reentrantly turned ears along its side edges, a generally rectangular box like spacer element having a downwardly facing opening, said spacer element having channels formed longitudinally along the interior faces of the side walls thereof, the lower edges of said ears engaging said channels, a compressible resilient pad interposed between said clip and retaining member, a screw upwardly traversing said clip, said pad, and said retaining member, a nut threadably engaging said screw, said web of said track section having a slot providing access to the head of said screw, said spacer element being adapted for securance to a ceiling.

10. A system according to claim 9, further defined by said connector assembly comprising a rectangular coupler plate having rectangular recesses in the top face thereof at its four corners defining a pair of longitudinally extending tongues in the top face of the coupler plate, said tongues of the coupler plate engaging the gaps between said first pair of strips of adjacent ones of said sections with the recesses of said coupler plate engaging the underfaces of said first pair of strips, a second substantially rectangular insulating connector block having a pair of transversely spaced longitudinal bores adjacent the sides thereof, upper and lower interconnected tubular conducting longitudinally extending spring clips disposed in each of said bores of said second block, the lower set of clips of said second block receiving pronged ends of said conductors of adjacent ones of said track sections, means securing said second block to said coupler plate, and a second channel shaped housing secured in enclosing relation to said second block.

11. An electrified track system for lighting fixtures and the like comprising a track section of hollow elongated configuration having a lower longitudinally extending opening, an elongated insulating element carried within said track section longitudinally thereof, at least two conductors embedded in said insulating element and extending longitudinally thereof, and means within said track section for releasably supporting a bus-bar-equipped lighting-fixture adaptor plug in said track section with the bus bars engaging said conductors, said track section including a pair of substantially parallel transversely spaced side walls interconnected by a transverse web, an intermediate pair of longitudinally extending horizontal shelf strips projecting inwardly from said side walls in downwardly spaced relation to said web, a lower pair of longitudinally extending horizontal shelf strips projecting inwardly from said side walls in downwardly spaced relation to said intermediate pair of strips, said intermediate and lower pairs of strips being adapted to mechanically support such an adaptor plug and defining longitudinally extending recesses therebetween respectively disposed along said side walls and offset relative to each other from top to bottom of said track section so as to enforce a predetermined orientation upon adaptor plugs supported thereby, and said insulating element being disposed between said web and said intermediate pair of strips.

12. A system according to claim 11 in which one of said strips is equipped along its inner edge with a lip having a generally vertical orientation establishing the position of the recess associated therewith.

13. A system according to claim 11 in which the strips constituting any pair thereof are in substantial transverse alignment, and in which the intermediate strip on one side of said track section is equipped along its inner edge with a downwardly turned lip and the lower strip on the other side of said track section is equipped along its inner edge with an upwardly turned lip, said lips establishing the positions of the recesses respectively associated therewith.

14. An electrified track system for lighting fixtures and the like comprising a track section of hollow elongated configuration having a lower longitudinally extending opening, an elongated insulating element carried within said track section longitudinally thereof, at least two conductors embedded in said insulating element and extending longitudinally thereof, means within said track section for releasably supporting a bus-bar-equipped lighting-fixture adaptor plug in said track section with the bus bars engaging said conductors, and at least one hanger element for securing said track section to a ceiling, said track section including a pair of substantially parallel transversely spaced side walls interconnected by a transverse web beneath which said insulating element is disposed, an upper pair of longitudinally extending horizontal shelf strips projecting inwardly from said side walls in downwardly spaced relation to the upper edges thereof and upwardly spaced relation to said web, said hanger element comprising a clip equipped with side flanges for respectively engaging said pair of strips, a spacer element adapted to be secured to a ceiling and having side walls defining a downwardly facing opening therebetween and having longitudinally extending channels along the interior faces thereof, a retaining member having transversely spaced ears engaging said channels, a compressible resilient pad interposable between said clip and retaining member, and a fastener for connecting said clip and retaining member so as to compress said pad therebetween.

References Cited
UNITED STATES PATENTS

| | | | |
|---|---|---|---|
| 2,680,233 | 6/1954 | McFarlin | 339—21 |
| 3,246,074 | 4/1966 | Neumann et al. | 339—21 X |
| 3,295,093 | 12/1966 | Neumann et al. | 339—21 |

RICHARD E. MOORE, Primary Examiner